May 19, 1953　　　　　S. M. TERRY　　　　　2,639,204
SEALED BEARING FOR ROTATABLE SHAFTS WITH LUBRICATORS
Filed Feb. 4, 1950　　　　　　　　　　　　2 Sheets-Sheet 1

INVENTOR.
Stanley M. Terry
BY
Fulvey, Souther & Stoltenberg

May 19, 1953  S. M. TERRY  2,639,204
SEALED BEARING FOR ROTATABLE SHAFTS WITH LUBRICATORS
Filed Feb. 4, 1950  2 Sheets-Sheet 2

INVENTOR.
Stanley M. Terry
BY
Falvey, Souther & Stoltenberg

Patented May 19, 1953

2,639,204

UNITED STATES PATENT OFFICE 2,639,204

SEALED BEARING FOR ROTATABLE SHAFTS WITH LUBRICATORS

Stanley M. Terry, Toledo, Ohio

Application February 4, 1950, Serial No. 142,367

4 Claims. (Cl. 308—187.1)

This invention relates to lubricating means for the bearings of high speed shafts which are sealed to cooperate with an enclosure for electrical apparatus having protruding rotating shafts to allow their operation under water or the like.

Sealed bearings for rotating shafts are well known in the art, but in applications where high speeds such as, for example, 10,000 R. P. M. are encountered, provision for ample lubrication must be made or the bearing and seal will have very short life, destroying both the seal and the usefulness of the device as well.

The present invention contemplates the provision of a sealed bearing for a rotating shaft which may be used beneath the surface of the water, which is provided with adequate and positive lubrication, so that the bearing seal and also the bearing itself will be useful over a long period of operation.

The invention further contemplates the provision of a sealed enclosure for an electrical instrumentality which has a projecting rotating shaft, so that the device may be used submerged in water.

It is, therefore, a principal object of this invention to provide a lubricator for a high speed bearing which is also provided with a seal which will be efficient at all speeds and will extend the useful period of operation of both the bearing and the seal.

It is a further object of this invention to provide a sealed enclosure for an electrical instrumentality having a protruding rotating shaft which will have an oil lubricated bearing and seal to allow use thereof submerged in water.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 2:
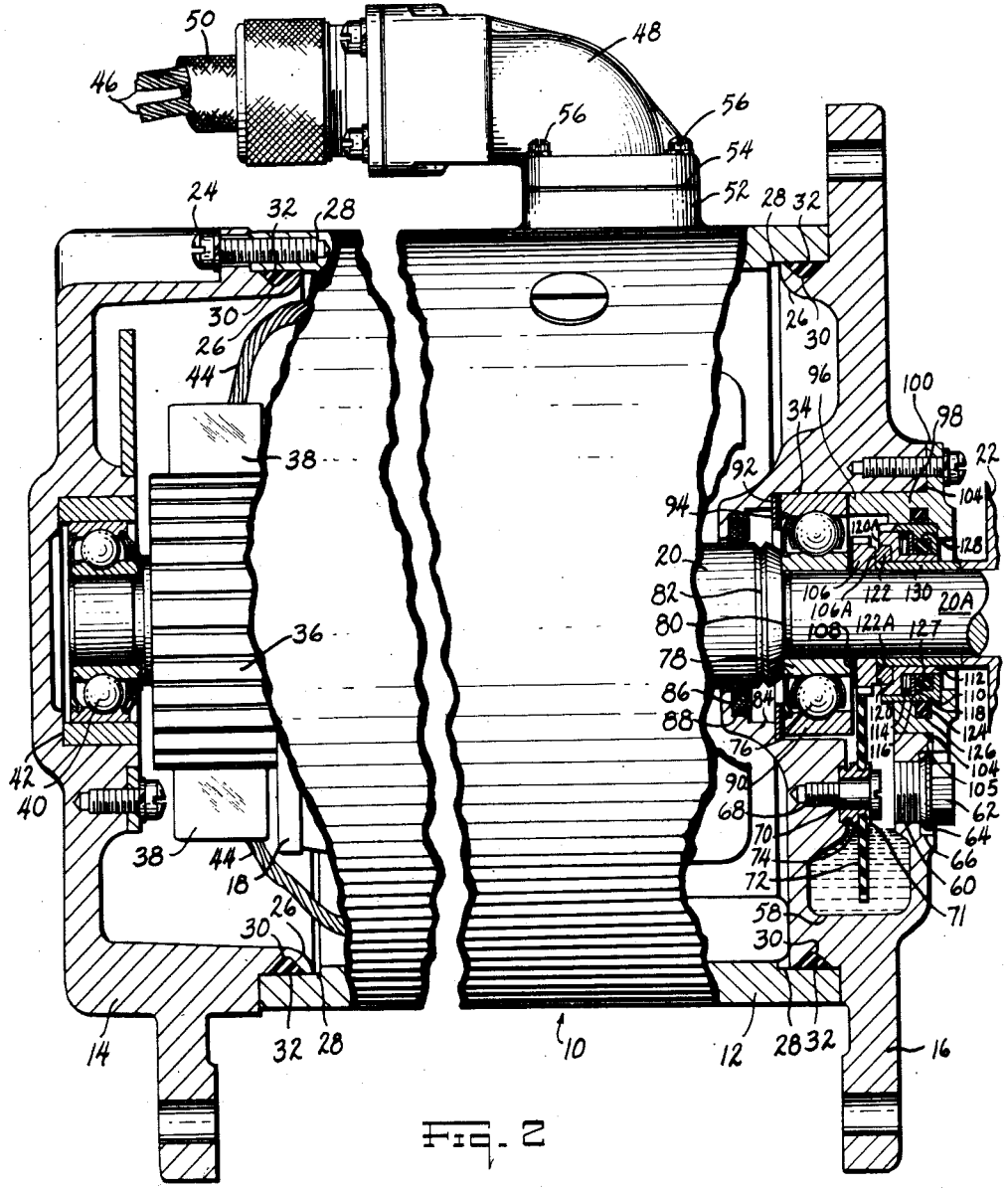
Fig. 2 is an enlarged elevational view, partly in section, of Fig. 1.
Figure 1:
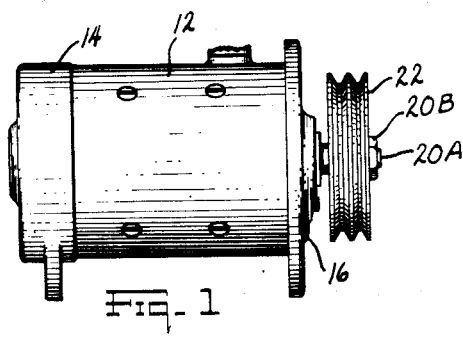
Fig. 1 is an elevational view of the device to which the invention has been applied.

Referring now to the drawings, particularly to Figs. 1 and 2, an electrical generator 10 is shown having a shell 12, with cooperating end heads 14 and 16, and an armature 18 having a rotating shaft 20 extending through the end head 16 and supplied with an external pulley 22 to apply rotative torque thereto to drive the generator in the well known manner.

The end heads 14 and 16 are attached to the shell 12 by means of screws 24 threaded into the ends of the shell 12. Each head is provided with an internally projecting flange 26 which cooperates with an undercut portion 28 on the interior of the shell 12, and each is provided with an external annular groove 30, into which is fitted a gasket 32 of the O ring type to form a seal between the parts. The end head 14 is closed in and forms a water-tight enclosure with the shell 12, while the end head 16 is provided with a central aperture 34, through which projects the rotating shaft 20 to cooperate with the pulley 22 to provide a driving means for the armature 18 for generating electric power. The opposite end of the armature is provided with a commutator 36 which cooperates with brushes 38 for collecting such generated power. Adjacent the commutator 36, the armature is supported for rotation by a ball bearing 40 fitted into a socket 42 in the end head 14, said socket having a grease chamber to provide for an ample supply of lubricant for the bearing.

The brushes 38 which collect the generated current are in electrical circuit with leads 44 which make the normal connection with the field coils (not shown) and the external leads 46 which enter the shell 12 through the water-tight elbow 48 as is best shown in Fig. 2. The external leads 46 may be positioned in an insulated armoured cable 50 and are connected to external circuits in any desirable way. The elbow 48 is mounted on a boss 52 on the housing 10, being sealed by a gasket 54 compressed by holding screws 56. The construction of these elbows are well known in the art and need not be described in further detail.

On the lower side of the central aperture 34, the end head 16 is provided with a pocket 58 which forms an oil reservoir to store oil for continuously lubricating the sealed bearing arrangement for the shaft 20 during rotation thereof which will be described hereinafter in further detail. The pocket 58 communicates with the aperture 34 and is provided with a filler opening 60, piercing the outer wall of the end head at the predetermined maximum level of the oil in the reservoir. The filler opening is threaded to seat a threaded plug 62 which is sealed by a gasket 64, preferably of the O ring type, seated in an indentation 66 on the outside of the end head. Concentric with the filler opening 60, a threaded aperture 68 is provided, into which is screwed a headed stud 70 having a rotatable sleeve 71 to which is affixed a fiber gear 72 for rotation therewith, being seated against a shoulder 74 on the sleeve. The gear 72 is of a dimension to extend a substantial distance below the level of the oil in the reservoir, so that when it is rotated, oil will be carried up by it to the bearing portions to be lubricated. The concentricity of the filler opening 60 and the threaded aperture 68 allows the stud 70 to be positioned in the threaded aperture 68 and, by the use of a hand tool through the filler opening 60, to be firmly screwed into its operative position. Assembly is thereby facilitated.

The shaft 20 is journaled for rotation in the aperture 34 by a ball bearing 76 whose inner raceway 78 is press-fitted on a reduced portion 20A of the shaft against a shoulder 80, which is cut away to form an oil slinger 82, adjacent a counterbore 84 of the aperture 34. A felt sealing ring 86 with its keeper embraces the shaft 20 behind the oil slinger 82 and is positioned in a second counterbore 88, so that oil will be prevented from entering the interior of the casing 10. Oil thrown off by centrifugal force by the slinger will flow back to the reservoir positioned at the lower level.

The outer raceway 90 of the ball bearing is positioned in the aperture 34 against a shoulder 92 formed with the counterbore 84 with a fluted spring washer 94 between for resiliency. The raceway is thrust against the washer and shoulder by a cutaway sleeve 96 integrally formed on the inner end of the bearing collar 98, which, at its outer end, has an outwardly-extending flange 100, through which screws 102 are fitted to screw into threaded aperture 104 on the outer face of the end head 16. As the screws 102 are pulled down and seated, a thrust is provided against the raceway to collapse the fluted spring and hold the bearing in assembled relation. The collapse of the fluted spring compensates for the tolerances in the parts and assures a tight assembly of the bearing parts to prevent rotation of the outer raceway in the aperture 34. An O ring seal 104 is provided between the collar 98 and the end head 16 adjacent the chamfered outer rim 105 of the aperture 34.

Figure 3:
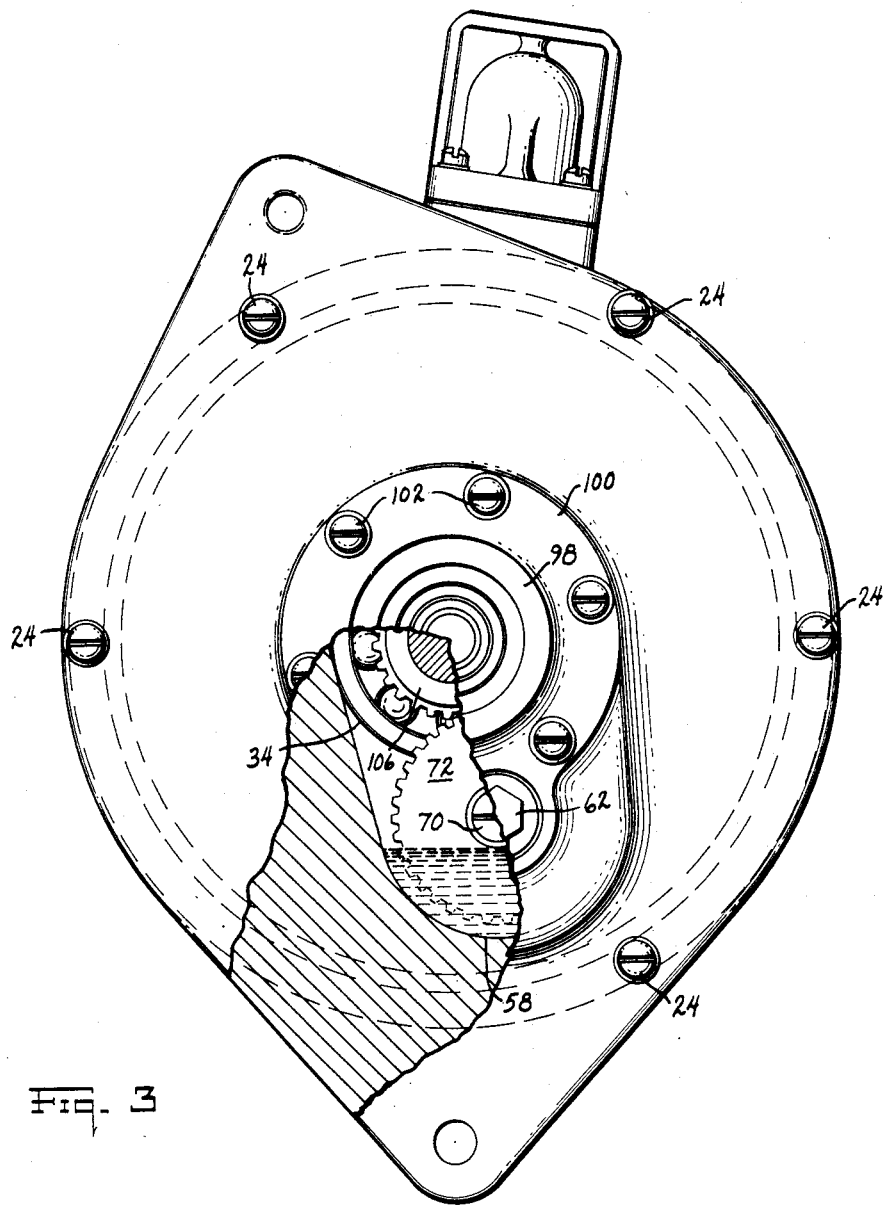
Fig. 3 is an elevational view, partly in section, taken from the right of Fig. 2.

The bottom portion of the sleeve 96 is cut away, as shown, to provide a clearance, through which the fiber gear 72 cooperates with a hardened steel mating ring or gear sleeve 106 fitted onto the shaft portion 20A by a sliding fit by engaging gear teeth cut in its periphery as is best seen in Fig. 3. The number of teeth on the cooperating members 72 and 106 are such that a speed reduction occurs, so that the fiber gear 72 rotates at a relatively lower speed than the sleeve 106, which rotates at shaft speed. The gear teeth on the sleeve are cut back to provide clearance at the forward side.

A copper gasket 108 is provided between the back side of the gear sleeve 106 and the inner raceway 78 of the ball bearing to provide a seal therebetween. The forward face 106A of the gear sleeve is lapped to provide a flat, smooth surface to provide a second seal as will be described hereinafter.

Figure 4:
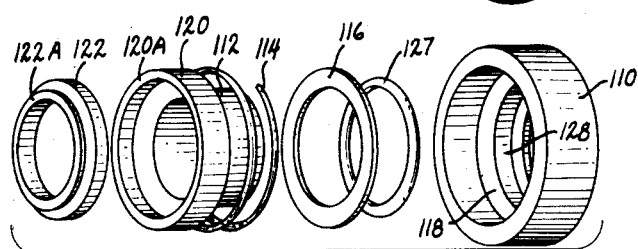
Fig. 4 is an exploded view of the parts forming some of the elements of the seal.

The sleeve 96 is provided with an internal shoulder, against which is seated a bearing seal assembly shown in exploded view in Fig. 4. The bearing seal consists, in part, of a holder 110 which fits against the shoulder as shown in Fig. 2, and an internal sleeve 112 which is resiliently urged inwardly by helical spring 114, seated against a washer 116 fitted against an internal shoulder 118 of the holder 110, and acting against an outwardly extending annular flange 120 of the internal sleeve 112 as is best seen in Fig. 2. The annular flange 120 is undercut to form an annular seat for a carbonaceous sealing ring 122 which is resiliently urged by the spring 114 into sealing contact with the lapped forward surface 106A of the gear sleeve 106 already described. The sealing ring 122 is in sealed relation with the flange 120 and extends beyond its rearward face 120A to provide a clearance between it and the lapped surface 106A.

A water-tight seal is provided between the sleeve 96 and the holder 110 by an O ring gasket member 124 fitted into an annular recess 126 on the interior of the sleeve 96 where the gasket member 124 resiliently contacts the exterior of the holder 110 to form the seal therebetween. A second water-tight seal is provided between the holder 110 and the internal sleeve 112 by a second O ring gasket 127 fitted into an undercut 128 of the holder 110, which is formed into a recess-like chamber by the washer 116 when seated against the shoulder 118. The gasket 127 resiliently grips the exterior of the internal sleeve 112 to form a seal with the holder 110.

The internal sleeve 112 with the carbonaceous sealing ring 122 are positioned with a sliding fit on the exterior of a sleeve 130 which is positioned with a sliding fit on the shaft extension 20A. The sleeve 130 is of sufficient length to extend from the lapped surface 106A to the exterior face of the sleeve 96 where it makes contact with the pulley 22 also positioned on the shaft portion 20A. The pulley 22 is keyed to the shaft in the well known manner and is held in position thereon by a nut 20B which pulls the pulley against the end of the sleeve 130, which, in turn, acts against the gear sleeve 106 to compress the copper gasket 108 to form a seal with the inner race 78 of the ball bearing which is press-fitted on the shaft against the shoulder 80. In this manner, the shaft 106 is sealed by the copper gasket 108 and the cooperative rotative relation between the lapped surface 106A and the rearward face 122A of the carbonaceous block 122.

During rotation of the armature 18 by a driving relation of a source of rotative force with the pulley 22, the bearing elements adjacent the pulley, including the sealing members, are constantly being lubricated by oil carried upwardly by the fiber gear 72 from the reservoir 58 and transferred to the gear sleeve 106. The O ring seals will prevent egress of oil outwardly toward the pulley 22, while the slinger 82 will prevent ingress of the oil into the interior of the casing 12. Oil thrown outwardly by centrifugal force by the slinger will flow by gravity back into the reservoir 58. The friction in the bearing and the friction between the contacting faces 106A and 122A of the seal are reduced to a minimum by the constant lubrication, so that it has been found that the wear after thousands of hours of operation is hardly measurable. This provides a mechanism which will have long bearing life and, at the same time, long life for the seals, inasmuch as, if substantial friction is found between the contacting surfaces 106A and 122A during rotation, the seal will quickly be destroyed so that operation under water will be impossible. It has been found that grease will not adequately lubricate a seal and bearing of this type at high rotational speeds, nor can the assembly be submerged in oil. The heat of friction in the oil in the latter case causes the bearing to heat and burn out, while in the first instance, the seal becomes dry and wears out.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a lubricating device, a rotatable shaft journaled in a relatively fixed member, a gear element rotatable with the shaft, an idler gear adapted to mesh with the first gear element and to be rotated therewith, said idler gear being journaled on the relatively fixed member adjacent the lower side of the shaft, an oil reservoir in the relatively fixed member, a sealing element for the shaft cooperating with the first gear element including a pair of lapped mating surfaces, and filling means for the oil reservoir adapted to maintain the oil level at a point where the idler gear is partly submerged in the oil whereby upon rotation of the elements the oil is carried upwardly to the shaft.

2. In a lubricating device, a rotatable shaft journaled in a bore of a relatively fixed member, a gear element rotatable with the shaft and affixed thereto, an idler gear adapted to mesh with the first gear element and to rotate therewith, said idler gear being journaled on the relatively fixed member in a pocket of the bore on the lower side of the shaft, said pocket forming an oil reservoir, and a filler plug fitted into an opening in the side of the pocket in alignment with the journal of the idler gear, the lower edge of the opening determining the level of the oil in the pocket so that the idler gear is partly submerged in oil whereby upon rotation of the elements the oil is carried upwardly to the shaft.

3. The combination set forth in claim 2 further characterized by having the journal for the idler gear formed by a threaded stud which may be inserted and removed through the opening in the pocket side.

4. The combination set forth in claim 2 further characterized by a shaft sealing element in spring-urged cooperation with the first gear element including a pair of lapped mating surfaces.

STANLEY M. TERRY.

References Cited in the file of this patent

UNITED STATES PATENTS

| Number | Name | Date |
|---|---|---|
| 1,541,124 | Dunham | June 9, 1925 |
| 1,701,535 | Holland-Letz | Feb. 12, 1929 |
| 1,865,083 | Daun et al. | June 28, 1932 |
| 2,447,671 | Schuck | Aug. 24, 1948 |
| 2,500,454 | Evans | Mar. 14, 1950 |

FOREIGN PATENTS

| Number | Country | Date |
|---|---|---|
| 247,394 | Great Britain | Feb. 18, 1926 |